United States Patent Office 2,801,195
Patented July 30, 1957

2,801,195
SOLDERING FLUX AND METHOD OF JOINING ALUMINUM THEREWITH

Richard L. Doerr, Niagara Falls, N. Y., assignor to Olin Mathieson Chemical Corporation, a corporation of Virginia No Drawing. Application April 14, 1953, Serial No. 348,823

6 Claims. (Cl. 148—23)

My invention relates to flux compositions for soldering operations, particularly aluminum soldering, and in particular to flux compositions comprising pyrazoline hydrohalides. This application is a continuation-in-part of my copending applications Serial No. 264,355 filed December 31, 1951, now abandoned, Serial No. 269,906 filed February 4, 1952, now abandoned, and Serial No. 269,908 filed February 4, 1952, now abandoned.

Aluminum fabrication has been handicapped by the absence of a commercially satisfactory fluxing material for the accepted solders, such as zinc or zinc-containing combinations, for example, zinc-cadmium or zinc-tin solders. For example, organic amines and amine derivatives have been proposed as fluxing materials, but the joints resulting from the soldering operations are susceptible to atmospheric corrosion and lack adequate bond strength, and indeed in many instances the solder may be peeled physically from the metal surface. Various reaction type fluxes have been proposed, but these materials accentuate corrosion difficulties by requiring the introduction of extraneous metals which give rise to electrolytic corrosion between the solder and the base metal. Also, the fluxing compositions that have been proposed to date, in general, require special procedures of application and create difficulties in removal of residues after soldering.

I have discovered that pyrazoline hydrohalides have special value as fluxes in aluminum soldering operations. The pyrazoline hydrohalides are readily soluble in water and thereby provide conveniently prepared flux compositions that are easily applied in production soldering operations. For example, concentrated solutions may be applied by spraying, painting, dipping and the like. Similarly, the residues from the use of the compositions during soldering may be readily removed by a hot water wash. The compositions may be used with the usual aluminum solders and provide seals and joints of excellent bond strength.

The pyrazoline hydrohalides useful in the flux compositions of my invention are advantageously obtained by the reaction of an aldehyde or a ketone with hydrazine and hydrogen halide. The compounds may be formed by separately reacting the aldehyde or ketone with hydrazine followed by reaction with the selected hydrogen halide or the compounds may be formed by reacting the aldehyde or ketone with a hydrazine monohydrohalide. Substituted hydrazines and hydrazine hydrohalides may be employed. For example, dimethyl hydrazine, phenyl hydrazine, hydroxy ethyl hydrazine or the hydrohalides thereof may be employed. The useful hydrogen halides include hydrogen fluoride, hydrogen bromide and hydrogen chloride, but I prefer compositions based upon hydrogen chloride. Suitable aldehydes and ketones that may be used to produce the pyrazoline hydrohalides are those containing at least one alpha hydrogen. At least one alpha hydrogen must be present in the carbonyl compound in order to effect ring closure to form the pyrazoline. For best results in application as a flux for aluminum soldering operations the nature of the organic radical should be selected to avoid excessive carbonization during the soldering operation. Thus aldehydes or ketones of good thermal stability provide suitable starting materials in the preparation of useful soldering fluxes.

I have found that pyrazoline hydrohalides prepared from ketones have particular value as fluxes in aluminum soldering. The pyrazolines prepared from acetone, i. e. 3,5,5 trimethyl pyrazoline hydrohalide, is particularly advantageous, but pyrazolines prepared from other lower aliphatic ketones such as methyl-ethyl ketone, di-acetone alcohol, di-ethyl ketone and methyl isobutyl ketone are also useful. In addition, methyl vinyl ketone, aldol, mesityl oxide and methyl phenyl ketone can be employed in producing pyrazoline hydrohalides which have value as aluminum soldering fluxes. Among the aldehydes, acetaldehyde, propionaldehyde, butyraldehyde, acrolein and crotonaldehyde may be employed.

In the preparation of the pyrazoline compounds, when saturated carbonyl compounds are used, preferably two moles or more of the aldehyde or ketone may be reacted with one mole of the hydrazine monohydrohalide by admixture at ordinary temperatures or with application of controlled heat. When certain unsaturated aldehydes or ketones, such as acrolein or crotonaldehyde, are used, one mole of the aldehyde or ketone is reacted with one mole of the hydrazine monohydrohalide. In the case of viscous or solid materials, an inert solvent is employed. The product may be recovered in the usual way by crystallization and filtration from the excess aldehyde or ketone or the reaction medium. Alternatively, the aldehyde or ketone may be reacted with hydrazine, either as a solution of the hydrate or in the anhydrous state, and the resulting reaction mixture is further reacted with aqueous or gaseous hydrogen halide. Again the reacting proportions are two moles or more of the saturated aldehyde or ketone, or one mole of the unsaturated, for each mole of hydrazine to be reacted and one mole of the hydrogen halide. The compounds prepared from the aldehyde or ketone, hydrazine and the hydrogen halide are advantageously recrystallized from methanol or other suitable solvent in order to obtain a purified product.

My invention thus provides an improvement in the method of soldering aluminum and also other metals, such as copper and brass, where the oxide can be reduced by the hydrazine. According to my invention, the solid or a solution, preferably an aqueous solution, of a pyrazoline hydrohalide is applied to the metal surface to be soldered. During the soldering operation the temperature and time should be controlled to prevent excessive charring and formation of difficult-to-remove carbonaceous flux residues. For example, it is advisable to limit the soldering temperature to a maximum of about 420° C., and the soldering time should be limited to a period of about 1 to 2 minutes. The soldering residues are easily removed from the metal by washing with hot water. The flux solutions may be variable in concentration according to the nature of the soldering operation, but concentrations of about 25 to 50 percent by weight are advantageous. For many operations, dilute solutions, e. g. about 2 percent, may be employed. Solvents other than water such as lower aliphatic ketones, e. g. acetone, lower aliphatic monohydric alcohols, e. g. methanol, ethanol, isopropanol or isobutanol and lower aliphatic dihydric alcohols, e. g. ethylene glycol, propylene glycol and butylene glycol, may be employed but are obviously less advantageous because of the greater expense, increased fire hazard and the problem of solvent recovery. Other materials may be compounded with the pyrazoline hydrohalides, for example, ammonium chloride which serves as a diluent or useful extender. A particularly advantageous flux composition is obtained by mixing stannous chloride with the pyrazoline hydrohalides as disclosed in my pending application Serial No. 348,824, filed April 14, 1953.

The method of application as noted before may be by spraying, painting, dipping or other suitable means. During the soldering operation the fluxing materials should not be exposed to a flame since they are combustible. The mechanism by which the pyrazoline compositions function during the soldering operation is not clear since the pyrazoline compound apparently does not reduce the film of aluminum oxide which must be fluxed from the metal surface. Rather the flux appears to remove the oxide film by mechanical action through properties of penetrability, spread action and rapid decomposition at the soldering temperature so that soldering metal is able to contact the aluminum surface. The pyrazoline compounds have value as fluxes in the soldering of a variety of metal surfaces, particularly aluminum and its alloys, as well as aluminum and its alloys with copper or brass in connection with solders such as cadmium-zinc and zinc-tin.

The preparation and usefulness of the pyrazoline hydrohalides as soldering fluxes will be further illustrated by the following examples.

Example I

Hydrazine monohydrochloride in the amount of 2.05 kilograms was reacted with 1.74 kilograms of acetone in an open vessel. White crystals of the resulting 3,5,5 trimethyl pyrazoline hydrochloride separated on cooling and were recovered by filtration. The remainder of the product is recovered by evaporation of the excess acetone and the water of reaction. The crystalline product was dried under vacuum at about 80° C.

Example II 3,5,5 trimethyl pyrazoline monohydrochloride and 3,5,5 trimethyl pyrazoline monohydrobromide prepared by the method of Example I were tested comparatively for fluxing action. The test was conducted by placing approximately a half gram piece of solder (60% zinc–40% cadmium) on a small piece of aluminum plate (0.005" sheeting), adding 5 drops of a 50 percent pyrazoline flux solution in water and placing the aluminum plate on a hot plate at 390° to 400° C. The solder melted and spread to its maximum area in approximately 30 seconds. The aluminum plate was removed from the hot plate in about one minute, allowed to cool and the residue was removed by washing with hot water. In each case only a very slight carbonaceous residue remained, the bulk of the residue having been removed readily by hot water washing. The bond strength was tested in each case and found stronger than the metal itself. The spread action was observed to be good in each instance although the hydrochloride composition appeared to be somewhat superior.

Example III

The pyrazoline formed by the reaction of methyl ethyl ketone and hydrazine hydrochloride was prepared and tested in a similar fashion to the methods of Examples I and II. The material was observed to be similar in terms of flux action and residue removal.

Example IV 3,5,5 trimethyl pyrazoline hydrochloride was prepared by reacting 67 grams of 95 percent anhydrous hydrazine by slow addition to 232 grams of acetone in a 500 cc. flask equipped with a reflux condenser. Considerable heat was evolved so that the solution refluxed. One mole of the resulting acetone azine intermediate was admixed with one mole of aqueous hydrochloric acid to produce the 3,5,5 trimethyl pyrazoline monohydrochloride. The resulting solution produced good results in aluminum soldering with a 60–40 zinc-cadmium solder.

I claim:

1. In the joining of aluminum, aluminum alloy, copper and brass metals by solder wherein a flux is used, the step of applying to the said metals to be joined a flux composition which consists essentially of a pyrazoline hydrohalide in which the pyrazoline is selected from the group consisting of pyrazoline and pyrazolines substituted with at least one substituent selected from the group consisting of lower alkyl substituents containing not more than 4 carbon atoms and phenyl substituents, the pyrazoline hydrohalide being present in the flux composition in at least an amount effective to provide fluxing activity.

2. The method of claim 1 in which the pyrazoline hydrohalide is 3,5,5-trimethyl pyrazoline monohydrochloride.

3. The method of claim 1 in which the pyrazoline hydrohalide is 3,5,5-trimethyl pyrazoline monohydrobromide.

4. The method of claim 1 in which the pyrazoline hydrohalide is in a carrier selected from the group consisting of water, lower aliphatic monohydric alcohols, lower aliphatic dihydric alcohols and lower aliphatic ketones, said alcohols and ketones containing not more than 4 carbon atoms.

5. The method of claim 4 in which the pyrazoline hydrohalide is 3,5,5-trimethyl pyrazoline monohydrochloride and the carrier is water.

6. The method of claim 4 in which the pyrazoline hydrohalide is 3,5,5-trimethyl pyrazoline monohydrobromide and the carrier is water.

References Cited in the file of this patent

UNITED STATES PATENTS

| | | |
|---|---|---|
| 2,155,307 | Hagemann | Apr. 18, 1939 |
| 2,612,460 | Willard et al. | Sept. 30, 1952 |

OTHER REFERENCES

Curtius: Berichte, vol. 27, pp. 770–773.

Beilstein: Handbuch der Organischen Chemie, vol. 23, page 34, citing Frey, Monats 22, p. 760.

Chemical Abstract: vol. 44, p. 1055, citing Lardelli, citing Helv. Chim. Acta, vol. 32, pp. 1817–35 (1949).